Patented Nov. 10, 1936

2,060,343

UNITED STATES PATENT OFFICE 2,060,343

METHOD OF COATING FABRIC WORK GLOVES

Robert C. Palicki, Toledo, Ohio

No Drawing. Application July 10, 1935, Serial No. 30,748

2 Claims. (Cl. 91—68)

This application relates to the production of fabric articles coated with rubber, and an object is to produce a new and improved method of producing rubber coated fabric work gloves and to solutions for use in connection therewith.

Other objects and advantages of the invention will hereinafter appear, and the following description is given by way of illustration, but not of limitation.

I have found that the following solution obtains a most efficient and satisfactory coating:

| | |
|---|---:|
| Rubber (as 60% latex) | 100 |
| Casein (ammoniated) | 0.05 |
| Kadox | 0.5 |
| Butyl zimate | 1.0 |
| Darvan (dry) | 0.1 |
| Caustic soda | 0.25 |
| Sulfur | 1.0 |
| Water | 2.95 |

In making up this solution the ammoniated casein is first mixed with the caustic soda in hot water, whereupon these ingredients, together with the other solid ingredients, are dispersed in a colloid or ball mill, for a period of about forty-eight hours. Thereupon this paste is mixed with the rubber in a suitable tank into which the fabric articles, such as work gloves, may be dipped.

Darvan is a dispersion similar to the higher type of alcohol treated with sulphuric acid, and, in a dry state, is found particularly advantageous for dispersing the dry ingredients in water before their addition to the latex. It is found to produce no noticeable change in the viscosity of the solution. As is well known, it is impractical to stir dry, water-insoluble powders, directly into latex, since they are not wetted by the latex, but in many cases quickly cause coagulation. Darvan has only a slight affect on the surface tension of water, and results in and producing an aqueous solution free from excessive tendency to foam. It is found that in a latex solution Darvan shows no tendency to mold, ferment, or putrefy, which is not true with most dispersing agents, and in view of this characteristic, dispersions prepared with Darvan, may be stored indefinitely without the addition of preservatives. A further advantage of Darvan and one which is particularly important in connection with the coating of fabric work gloves, is that it has no appreciable discoloring effect on the finished articles.

Butyl zimate zinc dibutyldithiocarbamate acts as an especially efficient accelerator, and militates against the finished product stiffening on aging. This ingredient gives fast cures at low temperatures. Good cures may be obtained by using 0.5 to 1% of sulphur, and from .05 to 1% butyl zimate (on the dry rubber content), and it is found that the cured film from such compound has unusually high tensiled strength. It is found that cures made immediately after compounding the latex mixes are found to be uncured, but this condition is obviated if the mix is allowed to stand one or two days before cures are made.

Kadox is chemically pure powdered zinc oxide, and is used as an activator of the organic accelerators and gives improved properties both initially and after aging. Although, theoretically, the amount of Kadox required for activation is relatively small, as a practical matter, an excess is desirable. It has been found that Kadox is most effective for use as an activator, probably due to its large specific surface and its high chemical purity.

Casein soaked in ammonia solution cold for ten minutes and then warmed for ten minutes to 150° F. provides a most efficient ingredient for preventing coagulation or agglomeration. It also increases the resistance of the mixture to mechanical coagulation. In this manner casein (ammoniated) serves as a stabilizer for the latex solution.

As it is well known, caustic soda prevents thickening of the latex mixture. It is found that some accelerators in the presence of Kadox will cause thickening of a mixture after standing a day or two, but caustic soda militates against such thickening.

It will be understood that the process of vulcanization is influenced by many factors, such as time, temperatures, concentration of sulphur, and the presence of ingredients other than sulphur and rubber. The amount of sulphur which combines with the rubber is dependent upon the temperature and time of heating, but for a given time and temperature the amount of combined sulphur depends upon the quantity of sulphur originally present.

A solution containing the above ingredients can be kept for about four days, but if it is to be kept longer than that, it cures too quickly and the coating becomes too brittle. Curing of the coating, which, preferably, is effected by dipping the fabric article into the solution, is effected at a temperature of about 150° F.

After the glove has been dipped in the solution several times, an interval of ten or fifteen minutes elapses between each coating, during which time the coating is subjected to heat, three coatings being usually found efficient for the purpose. The first dip should be very rapid, the gloves being dipped in and out of the solution and allowed to drain with the fingers down and until drops begin to form on the ends of the fingers. Thereafter they should be shaken and inverted and allowed to dry for a period that may vary from twenty to thirty minutes, keeping the fingers up during the drying operation. On the second dip the gloves are withdrawn more slowly. It is particularly important that the first dip should be accomplished rapidly to prevent the solution from striking through the rather porous and absorbent fabric.

Thereafter the rubber coated glove is dipped into a solution made up as follows:

| | |
|---|---|
| Powdered dry white shellac | lbs 25 |
| Borax | lbs 5 |
| Water | gals 26 |

In making up this solution the borax and water are first mixed together, the water being between 190° F. and 200° F. Thereafter the shellac is introduced into this mixture and allowed to stand for about three hours. If longer than three hours is taken the shellac precipitates, and if less than that, the shellac will not become dissolved satisfactorily. The solution should not come to a boil, because, if so, it is found that some solids go to the bottom, and the resultant coating is dead. By dipping the rubber coated gloves in this solution, not only is a preservative coating provided, but the gloves more efficiently resist abrasion.

It is to be understood that by fabric, as used in the specification and claims, is meant canton flannel and jersey gloves, as well as gloves which are faced with canton flannel or jersey and provided with palms of leather, and similar material.

What I claim as new and desire to secure by Letters Patent is:

1. The method of producing rubber coated fabric work gloves which consists in dipping fabric gloves in a solution consisting of rubber as 60% latex, ammoniated casein, Kadox, butyl zimate, a wetting agent, caustic soda, sulphur and water, vulcanizing such coating, and then dipping the first coating in a solution consisting of powdered dry white shellac, borax and water.

2. The method of producing rubber coated fabric work gloves which consists in dipping the gloves into a latex solution, removing the coated glove rapidly from the solution, shaking and inverting the gloves with the fingers uppermost, drying the coating for a period of about twenty-five minutes, dipping the gloves again into the solution, withdrawing same more slowly from the solution and drying the second coating.

ROBERT C. PALICKI.